United States Patent
Tsui et al.

(10) Patent No.: US 7,733,051 B2
(45) Date of Patent: Jun. 8, 2010

(54) MODEL-BASED ACTIVE ELECTRONIC DAMPING FOR STEPPER MOTORS

(75) Inventors: Wang Hay Kenneth Tsui, Kwai Chung (HK); Wai Chuen Gan, Kwai Chung (HK); Shing Wai Tam, Kwai Chung (HK); Gang Ou, Singapore (SG); Hon Yu Peter Ng, Kwai Chung (HK)

(73) Assignee: ASM Assembly Automation Ltd., Hong Kong (HK)

( * ) Notice: Subject to any disclaimer, the term of this patent is extended or adjusted under 35 U.S.C. 154(b) by 420 days.

(21) Appl. No.: 11/942,325

(22) Filed: Nov. 19, 2007

(65) Prior Publication Data

US 2008/0116835 A1    May 22, 2008

Related U.S. Application Data

(60) Provisional application No. 60/866,634, filed on Nov. 21, 2006.

(51) Int. Cl.
    *G05B 19/40* (2006.01)
(52) U.S. Cl. .................. 318/685; 318/611; 318/615; 318/629; 318/632
(58) Field of Classification Search .......... 318/629, 318/611, 615, 685, 696, 632; 324/125, 618, 324/623, 76.21
See application file for complete search history.

(56) References Cited

U.S. PATENT DOCUMENTS

| 3,660,746 | A  | * | 5/1972  | Milek ............... 318/696 |
| 5,659,234 | A  |   | 8/1997  | Cresens ............. 318/696 |
| 5,847,535 | A  |   | 12/1998 | Nordquist et al. ... 318/700 |
| 6,002,232 | A  | * | 12/1999 | McConnell et al. .. 318/629 |
| 6,040,676 | A  |   | 3/2000  | Nordquist et al. ... 318/696 |
| 6,140,793 | A  | * | 10/2000 | Carr et al. ......... 318/696 |
| 6,229,277 | B1 | * | 5/2001  | Hakala et al. ...... 318/629 |
| 7,429,846 | B2 | * | 9/2008  | Akiwa .............. 318/685 |

* cited by examiner

*Primary Examiner*—Bentsu Ro
*Assistant Examiner*—Thai Dinh
(74) *Attorney, Agent, or Firm*—Ostrolenk Faber LLP

(57) ABSTRACT

A method for damping vibrations in a stepper motor with micro-stepping control which comprises the steps of identifying the force amplitudes and phase shifts of multiple harmonic detent torques of the stepper motor, such as the first, second and fourth harmonic detent torques, and tuning the stepper motor with different current commands until minimum friction and resistive torque are obtained. Thereafter, a compensating harmonic current derived from said force amplitudes and phase shifts of the said multiple harmonic detent torques is injected into a current command during operation of the stepper motor to compensate for torque ripples.

7 Claims, 4 Drawing Sheets

MODEL-BASED ACTIVE ELECTRONIC DAMPING FOR STEPPER MOTORS

CROSS REFERENCE TO RELATED APPLICATION

This application claims the benefit and priority of U.S. Provisional Application Ser. No. 60/866,634 filed on Nov. 21, 2006, and entitled MODEL-BASED ACTIVE ELECTRONIC DAMPING FOR STEPPER MOTORS, the disclosure of which is incorporated herein by reference.

FIELD OF THE INVENTION

The invention relates to stepper motors, and in particular, to the damping of vibrations in stepper motors during operation, especially mechanical resonance at low speeds.

BACKGROUND AND PRIOR ART

A stepper motor is a motor wherein its driveshaft rotates in small angular steps rather than continuously. For example, each angular step in a commercial stepper system may comprise rotation of 1.8°. The driveshaft can thus be moved to any position reliably by sending an appropriate number of step pulses. Although stepper motors are generally slower as compared to servo motors, stepper motor systems have several significant advantages and thus are very popular in many industries. In particular, no position feedback information is normally required for either position control or speed control. Furthermore, in normal working states, positional error is non-accumulative. Besides, stepper motors are generally compatible with modern digital equipment.

For these reasons, various types and classes of stepping motor have been used in computer peripherals, automated machinery and similar systems. The cost of stepper systems is significantly lower than that of servo systems, mainly due to the removal of costly position feedback devices and complicated feedback control. Moreover, it does not require the tuning of feedback control which needs extra expertise and effort. Also, the simple hardware and control configuration improves system reliability.

However, one of the most unfavorable features of stepper motors is mechanical resonance, especially at low speeds. The problem is less significant at high speeds as the mechanical system tends to filter out high frequency resonance. Resonance prevents the stepper motor from running steadily at certain speeds and reduces the usable torque. Also, it prevents stepper motors from being used on applications that require smooth low speed motion. Resonance exists even with very fine microstepping control due to motor characteristics.

Various damping techniques have been applied in the art to overcome this problem, including mechanical damping, linearized feedback control and electronic damping.

U.S. Pat. No. 5,659,234 entitled "Vibration reduction for stepping motor by vector angle and vector length modulation" describes a method which reduces the vibration caused by system characteristics (including motor characteristic, speed of operation and stepping noise). On a test rig, the dynamic behaviour of the stepping motor in micro stepping mode is measured by a system comprising a rotation encoder. The measured data are filtered and used to compensate the unwanted speed fluctuations. A correction vector table is found iteratively by observing a velocity ripple. The method is applied to a particular configuration of a system characteristic at fixed speed. It is not applicable to a particular motor model as such and cannot be applied to various configurations and speeds.

U.S. Pat. No. 5,847,535 entitled "Active electronic damping for step motor" discloses a different type of damping method based on sensorless technology. A motor torque output is estimated and is compared with an expected value in real time during operation. Position commands are adjusted accordingly to compensate for the torque ripple.

U.S. Pat. No. 6,040,676 entitled "Passive electronic damping for step motor" describes yet another different type of damping method based on capacitor-inductor electrical interaction. A capacitor with matched value is used to create a virtual short circuit path for the electric frequency in vibration. Vibration energy is thus quickly dissipated.

Nevertheless, prior art damping methods have their limitations. For example, mechanical dampers will wear out with prolonged use. Feedback control requires the use of high resolution position feedback devices. Finally, electronic damping usually requires high order equations and complicated motor characteristics identification. Therefore, the need for an effective and practical damping technique still exists. It would be advantageous to provide a novel damping approach that can be applied to different stepper motor models with variable configurations and operation speeds.

SUMMARY OF THE INVENTION

It is thus an object of the invention to seek to model the behavior of a commercial stepper motor accurately and efficiently, and to provide a damping technique that can be applied to different stepper motor models with variable configurations and operation speeds.

Accordingly, the invention provides a method for damping vibrations in a stepper motor with micro-stepping control, comprising the steps of: identifying the force amplitudes and phase shifts of multiple harmonic detent torques of the stepper motor; tuning the stepper motor with different current commands until minimum friction and resistive torque are obtained; and then injecting a compensating harmonic current derived from said force amplitudes and phase shifts of the said multiple harmonic detent torques into a current command during operation of the stepper motor to compensate for torque ripples.

It would be convenient hereinafter to describe the invention in greater detail by reference to the accompanying drawings which illustrates a preferred embodiment of the invention. The particularity of the drawings and the related description is not to be understood as superseding the generality of the broad identification of the invention as defined by the claims.

BRIEF DESCRIPTION OF THE DRAWINGS

Examples of preferred embodiments of electronic damping systems in accordance with the invention will now be described with reference to the accompanying drawings, in which.

DETAILED DESCRIPTION OF THE PREFERRED EMBODIMENT OF THE INVENTION

In the following description, it is assumed that the stepper motor used is optimized for sinusoidal microstep control. For open loop damping algorithms, it is assumed that fine microstepping (e.g. 1/64 or less) is used.

A simplified stepper motor model, including electrical dynamics and torque expression, is used most of the time for efficiency. The simplified stepper motor electrical dynamics and torque expressions are as follows:

$$\frac{di_a}{dt} = -\frac{R}{L_o}i_a + \frac{K_m}{L_o}\omega\sin(N_r\theta) + \frac{v_a}{L_o} \quad (1)$$

$$\frac{di_b}{dt} = -\frac{R}{L_o}i_b - \frac{K_m}{L_o}\omega\sin(N_r\theta) + \frac{v_b}{L_o} \quad (2)$$

$$\tau = K_m[-i_a\sin(N_r\theta) + i_b\cos(N_r\theta)] - K_{d4}\sin(4N_r\theta) \quad (3)$$

where $i_a$ is the phase A current (A); $i_b$ is the phase B current (A); R is the winding resistance ($\Omega$); $L_o$ is the winding inductance (H); $K_m$ is the motor force constant or back e.m.f. constant (Nm/A); $\omega$ is the rotor angular velocity (rad/s); $N_r$ is the number of pole pairs per revolution; $\theta$ is the rotor angular position (rad); $v_a$ is the phase A voltage (V); and $v_b$ is the phase B voltage (V).

With micro-stepping control, the above simplified model predicts only one resonant speed, which is caused by the $4^{th}$ harmonic detent torque ripple, the last term in Equation (3). This is not fully compatible with that of a commercial stepper in real life. Commercial stepper motors may have multiple resonant speeds, such as three resonant speeds. Thus, it would be desirable to define a new stepper torque expression to model this characteristic without using high order equations and complicated identification procedures. Open loop and servo control algorithms with feed forward damping techniques are proposed accordingly. The damping techniques have been simulated and the results show that the proposed algorithms can effectively reduce the adverse effects of resonance at low speed.

A. Stepper Motor Model

Figure 1:
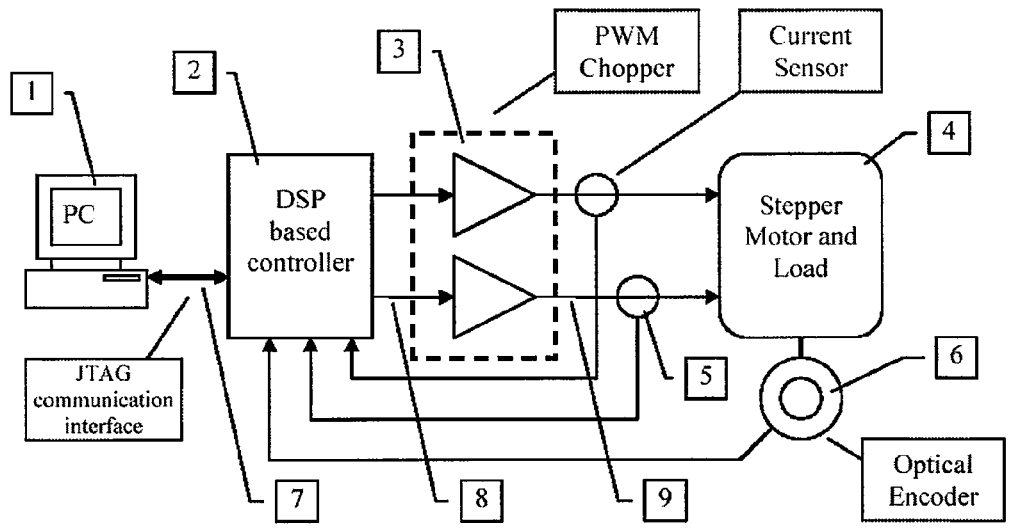
FIG. 1 is a block diagram of an exemplary stepper motor system for implementing a damping system according to the preferred embodiment of the invention.

FIG. 1 is a block diagram of an exemplary stepper motor system for implementing a damping system according to the preferred embodiment of the invention. The system contains a DSP based controller 2 to control the required motion, damping and current loop. The controller is connected to a PC 1 through a JTAG communications interface 7 (or any other type of serial link) such that the user can tune the system and monitor system performance through the PC 1. The controller 2 outputs PWM signals 8 (or any other types of commands) that are used to control the power stage 3. The power stage 3 is a three-phase chopper (or a two-phase H-bridge) made up of voltage source inverters (or linear amplifiers). Phase current is detected by a current sensor 5 and fed back to the controller 2. Outputs 9 of the power stage 3 are connected to an investigated two-phase (or four-phase) hybrid stepper motor 4. An optical encoder 6 (or any position sensing device) is mounted on a motor shaft of the stepper motor to provide position feedback to the controller 2.

With the above set-up, we can identify the motor characteristics to fill in all the required constants in the following equation:

$$\tau = K_m[-i_a\sin(N_r\theta) + i_b\cos(N_r\theta)] - K_{d4}\sin(4N_r\theta) - K_{d2}\sin(2N_r\theta + \phi_2) - K_{d1}\sin(N_r\theta + \phi_1) - F_s \quad (4)$$

where $K_{d1}$ is a force amplitude of the $1^{st}$ harmonic detent torque (Nm); $K_{d2}$ is a force amplitude of the $2^{nd}$ harmonic detent torque (Nm); $K_{d4}$ is a force amplitude of the $4^{th}$ harmonic detent torque (Nm); $\phi_1$ is a phase shift of the $1^{st}$ harmonic detent torque (rad); $\phi_2$ is a phase shift of the $2^{nd}$ harmonic detent torque (rad); and $F_s$ is the static friction (Nm).

To fill in the constants $K_{d4}$ $K_{d2}$ $K_{d1}$ $\phi_2$ $\phi_1$ $F_s$ in the above Equation (4), we need to identify the characteristics of the studied stepper motor. The stepper system is running in servo mode with the control algorithm described in equations (5) and (6) below.

Figure 3:
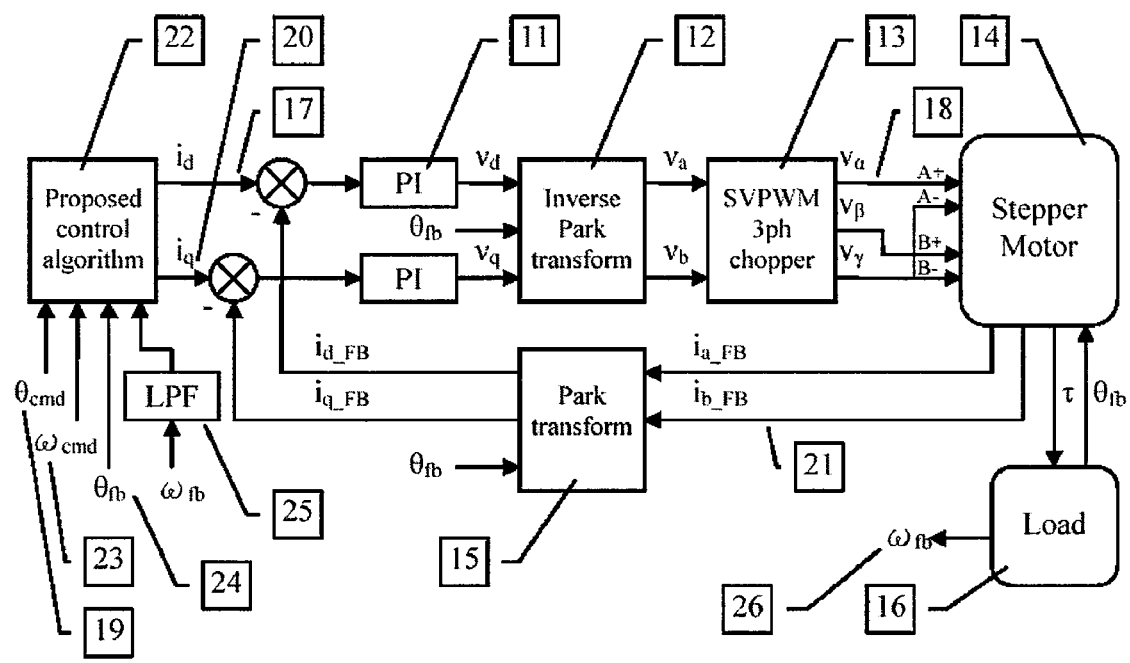
FIG. 3 is a block diagram of an exemplary stepper system in servo mode for implementing the damping system.

For reference, FIG. 3 is a block diagram of an exemplary stepper system in servo mode for implementing the damping system. $K_m$ is set to 0.3 and $N_r$ is set to 50 as given by the motor specification. $\theta_{fb}$ is obtained from the optical encoder feedback.

$$i_{d\_cmd} = 0 \quad (5)$$

$$i_{q\_cmd} = \frac{1}{K_m}\left[\begin{array}{c} K_{d4}\sin(4N_r\theta_{fb}) + K_{d2}\sin(2N_r\theta_{fb} + \phi_2) + \\ K_{d1}\sin(N_r\theta_{fb} + \phi_1) + F_s \end{array}\right] \quad (6)$$

where $i_{d\_cmd}$ is d-axis (direct-axis) current command; and $i_{q\_cmd}$ is q-axis (quadrature-axis) current command.

The parameters to be identified are tuned until minimum friction and resistive torque are observed and a period torque ripple is removed. The obtained parameters are then substituted back into Equation (4) above to complete the torque expression. Note that the parameters can also be obtained by measuring the motor static torque-position characteristic followed by a frequency domain analysis, but implementing such an approach would be complicated and expensive.

B. Open Loop System

The damping algorithms according to the preferred embodiments of the invention for open loop and servo control are based on the mentioned stepper motor model. Harmonic current is injected into the current command (Q axis, on DQ plane) to compensate for the identified torque ripple.

Figure 2:
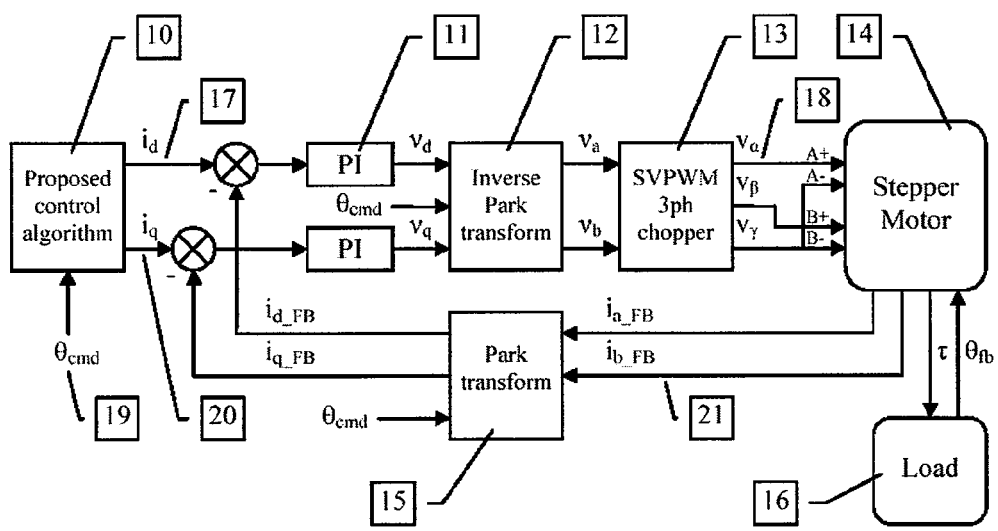
FIG. 2 is a block diagram of an exemplary stepper motor system in open-loop mode for implementing the damping system.

FIG. 2 is a block diagram of an exemplary stepper motor system in open-loop mode for implementing the damping system. All the calculations are preferably implemented in the DSP based controller 2 (or FPGA, ASIC or analog circuit). A proposed open loop control algorithm 10 generates current commands (17 and 20) according to a position command (19) received for positioning the stepper motor. A standard PI (proportion-integration) controller 11 receives the current command $i_d$, such that the $v_d$ produced (including the subtraction between the PI controller 11 and the open loop control algorithm 10) is:

$$v_d = K_p(i_{d\_cmd} - i_{d\_fb}) + K_i\int(i_{d\_cmd} - i_{d\_fb})dt, \text{ where } K_p \text{ and } K_i \text{ are constants.}$$

An Inverse Park Transform module 12 transforms variables $v_d$ and $v_q$ from a rotating reference frame to a stationary reference frame based on a position command $\theta_{cmd}$ input into it. A SVPWM 3-phase chopper 13 generates a 3-phase voltage from the 2-phase voltage command produced by the Inverse Park Transform module 12. The 3-phase voltage 18 ($v_\alpha$, $v_\beta$ and $v_\gamma$) generated by the 3-phase SVPWM chopper 13 is transmitted to the stepper motor 14, which generates torque $\tau$ according to the phase current and the rotor position. A resultant motor load 16 is exerted. A simple inertia load is assumed for simple analysis. Its position, velocity and acceleration are responsive to the torque $\tau$ exerted on it.

A feedback current $i_{a\_FB}$ of the stepper motor 14 is fed back to the driver for current control. The feedback current $i_{a\_FB}$ has a phase current 21 and is transmitted to a Park Transform 15 which is operative to transform variables $i_{a\_FB}$, $i_{b\_FB}$ from a stationary reference frame to a rotating reference frame.

Based on the stepper motor model proposed in relation to the closed-loop system shown in FIG. 1, the MatLab model of the open loop system is built as illustrated in FIG. 2. Control algorithms shown in Equations (7) and (8) are used to damp out the resonances. Note that all the three terms in $i_{q\_cmd}$ are detent torque compensation components. Constants obtained in relation to Equation (4) will be substituted into Equation (8).

$$i_{d\_cmd} = 1.9 \tag{7}$$

$$i_{q\_cmd} = \frac{1}{K_m}\left[\begin{array}{c} K_{d4}\sin(4N_r\theta_{cmd}) + K_{d2}\sin(2N_r\theta_{cmd} + \phi_2) + \\ K_{d1}\sin(N_r\theta_{cmd} + \phi_1) \end{array}\right] \tag{8}$$

Assuming rigid mounting of a dummy load without load torque, the load is described by Equation (9). D is a damping factor which is assumed to be 0.001 Nm/rad s$^{-1}$ for a lightly damped system.

$$\begin{bmatrix} \dot{\theta} \\ \dot{\omega} \end{bmatrix} = \begin{bmatrix} 0 & 1 \\ 0 & 0 \end{bmatrix}\begin{bmatrix} \theta \\ \omega \end{bmatrix} + \begin{bmatrix} 0 \\ 1 \end{bmatrix}\left[-\frac{D\omega}{J} + \frac{\tau}{J}\right] \tag{9}$$

A three phase SVPWM driving scheme is described by Equations (10)-(13).

$$\begin{bmatrix} v_\alpha \\ v_\beta \\ v_\gamma \end{bmatrix} = \begin{bmatrix} 1 & 0 & 1 \\ 0 & 1 & 1 \\ 0 & 0 & 1 \end{bmatrix}\begin{bmatrix} v_a \\ v_b \\ v_o \end{bmatrix} \tag{10}$$

$$v_{max} = \text{Maximum }\{v_a, v_b, 0\} \tag{11}$$

$$v_{min} = \text{Minimum }\{v_a, v_b, 0\} \tag{12}$$

$$v_o = \frac{v_i}{2} - \frac{(v_{max} + v_{min})}{2} \tag{13}$$

where $v_\alpha$, $v_\beta$, $v_\gamma$ are average voltage outputs of the three phase SVPWM power stage; $v_o = v_\gamma$ which is average voltage of the common voltage reference of the other two phases.

In addition, zero-order hold is applied on $v_\alpha v_\beta v_\gamma$ to simulate the periodic PWM update of the chopper drive.

With the injection of 4$^{th}$, 2$^{nd}$ and 1$^{st}$ harmonic detent torque compensation in $I_{q\_cmd}$, the 1$^{st}$, 2$^{nd}$ and 3$^{rd}$ resonance can be damped out respectively. When all the three compensation components in $I_{q\_cmd}$ are applied, the velocity ripple is almost totally eliminated.

Note that $I_{d\_cmd}$ 17 indicates a holding current which can be changed depending on the user's requirement. $I_{q\_cmd}$ 20 contains the harmonic current to compensate for the identified torque ripple. Also note that for $I_{q\_cmd}$ 20 in Equation (8), the phase shift of torque ripple compensation ($\phi_1$ and $\phi_2$) may be affected by the working condition. They may vary with load torque, load inertia, damping factor, and so on.

C. Servo System

A MatLab model of a servo controlled stepper system is built as illustrated in FIG. 3. A proposed servo control algorithm 22 generates current commands $i_d$ and $i_q$ (17 and 20) according to a position command $\theta_{cmd}$ (19) received for positioning the stepper motor. In this embodiment, a velocity command $\omega_{cmd}$ 23 is also provided for positioning the stepper motor.

A standard PI (proportion-integration) controller 11 receives the current command $i_d$, such that the $v_d$ produced (including the subtraction between the PI controller 11 and the open loop control algorithm 10) is:

$$v_d = K_p(i_{d\_cmd} - i_{d\_fb}) + K_i\int(i_{d\_cmd} - i_{d\_fb})dt, \text{ where } K_p \text{ and } K_i \text{ are constants.}$$

An Inverse Park Transform module 12 transforms variables $v_d$ and $v_q$ from a rotating reference frame to a stationary reference frame based on a position feedback $\theta_{fb}$ input into it. A SVPWM 3-phase chopper 13 generates a 3-phase voltage from the 2-phase voltage command produced by the Inverse Park Transform module 12. The 3-phase voltage 18 ($v_\alpha$, $v_\beta$ and $v_\gamma$) generated by the 3-phase SVPWM chopper 13 is transmitted to the stepper motor 14, which generates torque $\tau$ according to the phase current and the rotor position. A resultant motor load 16 is exerted. A simple inertia load is assumed for simple analysis. Its position, velocity and acceleration are responsive to the torque $\tau$ exerted on it.

A feedback current $i_{a\_FB}$ of the stepper motor 14 is fed back to the driver for current control. The feedback current $i_{a\_FB}$ has a phase current 21 and is transmitted to a Park Transform 15 which is operative to transform variables $i_{a\_FB}$, $i_{b\_FB}$ from a stationary reference frame to a rotating reference frame.

The following control algorithm in Equations (14) and (15) is proposed for smooth low speed servo motion:

$$i_{d\_cmd} = 0 \tag{14}$$

$$i_{q\_cmd} = \frac{1}{K_m}\left[\begin{array}{c} K_{p\_vel}\omega_{err} + K_{p\_pos}\theta_{err} + K_{i\_pos}\int\theta_{err}dt + \\ K_{d4}\sin(4N_r\theta_{fb}) + K_{d2}\sin(2N_r\theta_{fb} + \phi_2) + \\ K_{d1}\sin(N_r\theta_{fb} + \phi_1) + F_s \end{array}\right] \tag{15}$$

where $\omega_{err} = \omega_{cmd} - \omega_{fb}$ and $\theta_{err} = \theta_{cmd} - \theta_{fb}$ The effect of finite resolution of the encoder is modeled by the quantization of $\theta_{fb}$. As the velocity is found by differentiating the motor's respective positions, the resolution of the velocity depends on the sample rate as well as the resolution of the encoder 9. In the servo system, the encoder resolution may be 4000 pulses/rev and the calculation may be done at 20 kHz. This means the resolution may be 1/4000×20000×60=300 rpm.

Note that with a low resolution optical encoder, velocity feedback $\omega_{fb}$ 26 is noisy since it is obtained by differentiating the position feedback $\theta_{fb}$ 24. A low pass filter 25 is needed to filter out the noise. Thus, system response to velocity error is unsatisfactory without the torque ripple compensation as described. Also note that the position feedback $\theta_{fb}$ 24 may be obtained by any position sensing device or sensorless observer.

The damping and control algorithm is preferably coded into the DSP controller 2 and the current loop is tuned to ensure good current tracking even when the motor is running at high speed.

Figure 4:
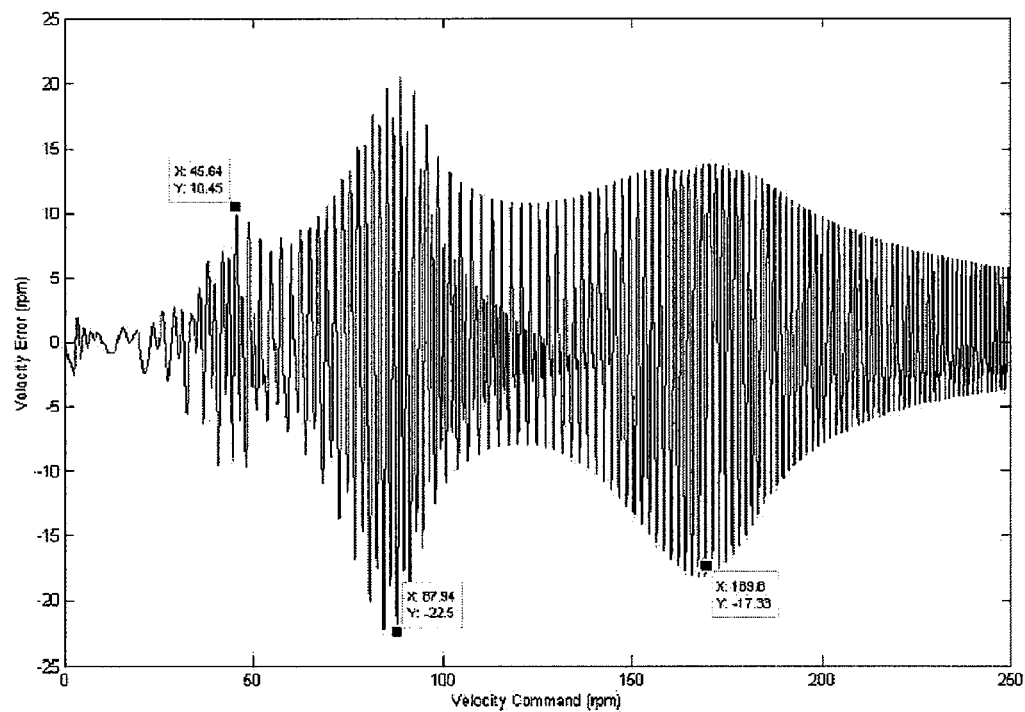
FIG. 4 is a chart showing simulated velocity errors of the open-loop stepper motor generated from different velocity commands without damping.
Figure 5:
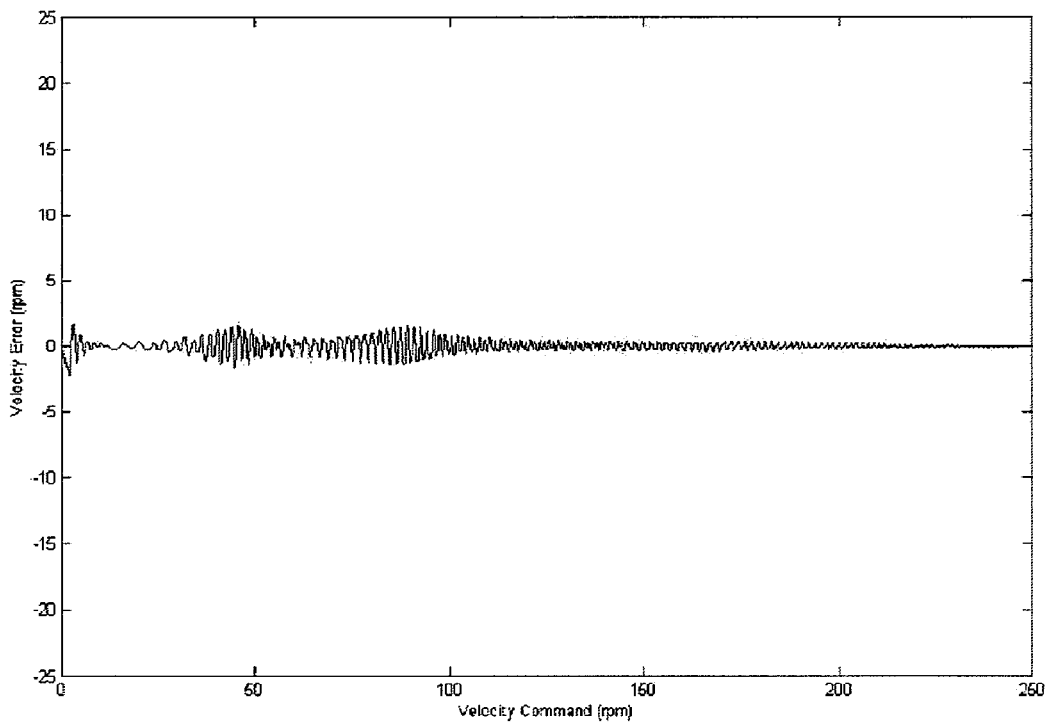
FIG. 5 is a chart showing simulated velocity errors of the open-loop stepper motor generated from different velocity commands with damping applied according to the preferred embodiment of the invention.
Figure 6:
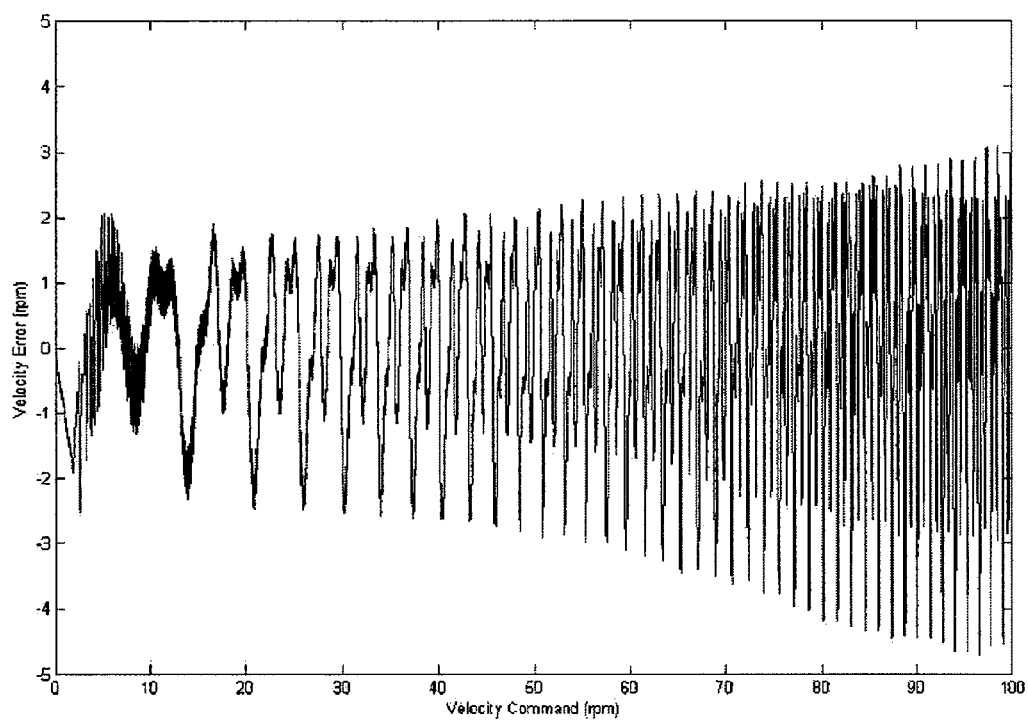
FIG. 6 is a chart showing simulated velocity errors of the motor operated in servo mode generated from different velocity commands without damping.
Figure 7:
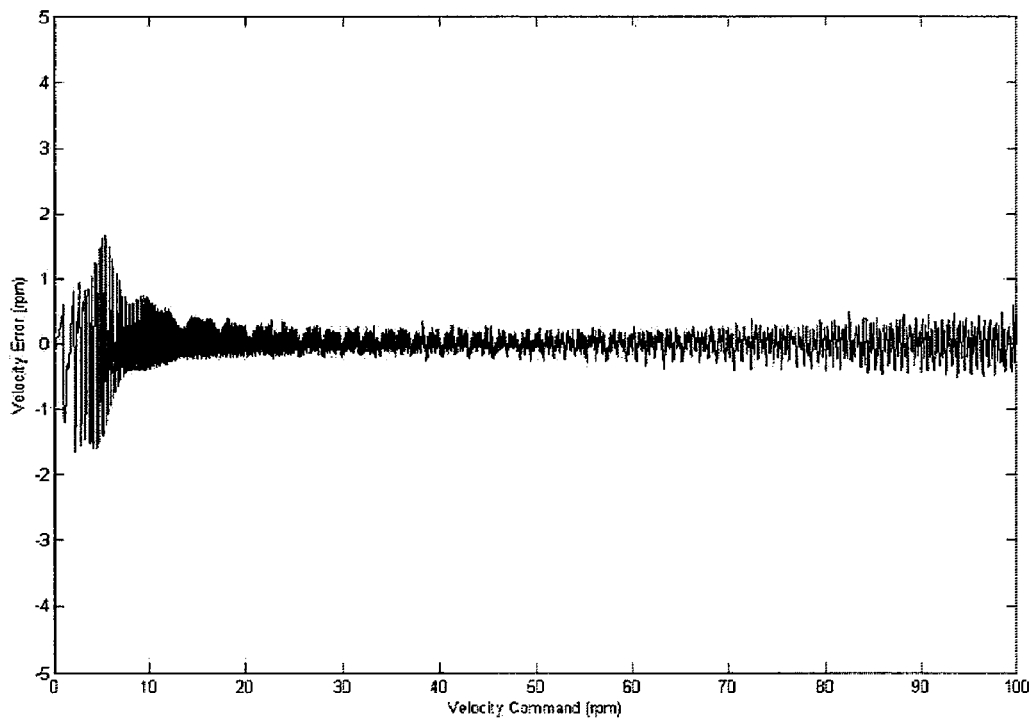
FIG. 7 is a chart showing simulated velocity errors of the motor operated in servo mode generated from different velocity commands with damping applied according to the preferred embodiment of the invention.

In open loop mode, all resonance points are eliminated. FIG. 4 is a chart showing simulated velocity errors of the open-loop stepper motor generated from different velocity commands without damping and FIG. 5 is a chart showing simulated velocity errors of the open-loop stepper motor generated from different velocity commands with damping applied according to the preferred embodiment of the invention;

In servo mode, the smoothness of low speed motion is improved. FIG. 6 is a chart showing simulated velocity errors of the motor operated in servo mode generated from different velocity commands without damping, and FIG. 7 is a chart showing simulated velocity errors of the motor operated in servo mode generated from different velocity commands with damping applied according to the preferred embodiment of the invention.

It would be appreciated that the stepper torque expression as applied to the dampening system according to the preferred embodiment of the invention can model the characteristics of a stepper motor without using high order equations and complicated identification procedures. The described procedure used to identify the motor characteristics is simple and requires only a low resolution position feedback device, which is relatively inexpensive.

Both simulation and experimental results show that the damping system according to the preferred embodiment of the invention can effectively damp out low speed motor vibration.

The invention described herein is susceptible to variations, modifications and/or additions other than those specifically described and it is to be understood that the invention includes all such variations, modifications and/or additions which fall within the spirit and scope of the above description.

The invention claimed is:

1. Method for damping vibrations in a stepper motor with micro-stepping control, comprising the steps of:
   identifying the force amplitudes and phase shifts of multiple harmonic detent torques of the stepper motor;
   tuning the stepper motor with different current commands until minimum friction and resistive torque are obtained; and then
   injecting a compensating harmonic current derived from said force amplitudes and phase shifts of the said multiple harmonic detent torques into a current command during operation of the stepper motor to compensate for torque ripples.

2. Method for damping vibrations as claimed in claim 1, wherein the said multiple harmonic detent torques comprise the first, second and fourth harmonic detent torques of the stepper motor.

3. Method for damping vibrations as claimed in claim 1, wherein the stepper motor is operated in open-loop mode.

4. Method for damping vibrations as claimed in claim 3, wherein torque compensation components comprised in the compensating harmonic current are expressed by the equation:

$$i_{q\_cmd} = \frac{1}{K_m}\left[\begin{array}{c} K_{d4}\sin(4N_r\theta_{cmd}) + K_{d2}\sin(2N_r\theta_{cmd} + \phi_2) + \\ K_{d1}\sin(N_r\theta_{cmd} + \phi_1) \end{array}\right]$$

wherein $i_{q\_cmd}$ is the compensating harmonic current; $K_m$ is a motor force constant of the stepper motor; $K_{d1}$ is a force amplitude of the first harmonic detent torque; $K_{d2}$ is a force amplitude of the second harmonic detent torque; $K_{d4}$ is a force amplitude of the fourth harmonic detent torque; $\phi_1$ is a phase shift of the first harmonic detent torque; $\phi_2$ is a phase shift of the second harmonic detent torque; $N_r$ is the number of pole pairs per revolution; and $\theta_{cmd}$ is a position command.

5. Method for damping vibrations as claimed in claim 1, wherein the stepper motor is operated in servo mode.

6. Method for damping vibrations as claimed in claim 5, wherein torque compensation components comprised in the compensating harmonic current are expressed by the equation:

$$i_{q\_cmd} = \frac{1}{K_m}\left[\begin{array}{c} K_{p\_vel}\omega_{err} + K_{p\_pos}\theta_{err} + K_{i\_pos}\int \theta_{err} dt + \\ K_{d4}\sin(4N_r\theta_{fb}) + K_{d2}\sin(2N_r\theta_{fb} + \phi_2) + \\ K_{d1}\sin(N_r\theta_{fb} + \phi_1) + F_s \end{array}\right]$$

wherein $i_{q\_cmd}$ is the compensating harmonic current; $K_m$ is a motor force constant of the stepper motor; $K_{d1}$ is a force amplitude of the first harmonic detent torque; $K_{d2}$ is a force amplitude of the second harmonic detent torque; $K_{d4}$ is a force amplitude of the fourth harmonic detent torque; $K_{p\_vel}$ and $K_{p\_pos}$ are constants; $\phi_1$ is a phase shift of the first harmonic detent torque; $\phi_2$ is a phase shift of the second harmonic detent torque; $N_r$ is the number of pole pairs per revolution; and $\omega_{err}=\omega_{cmd}-\omega_{fb}$ and $\theta_{err}=\theta_{cmd}-\theta_{fb}$, where $\omega_{cmd}$ and $\theta_{cmd}$ are velocity and position commands respectively and $\omega_{fb}$ and $\theta_{fb}$ are velocity and position feedback respectively.

7. Method for damping vibrations as claimed in claim 1, wherein a torque expression for the stepper motor is represented by the equation:

$$\tau = K_m[-i_a\sin(N_r\theta) + i_b\cos(N_r\theta)] - K_{d4}\sin(4N_r\theta) - K_{d2}\sin(2N_r\theta + \phi_2) - K_{d1}\sin(N_r\theta + \phi_1) - F_s$$

wherein $K_m$ is a motor force constant of the stepper motor; $i_a$ is a phase A current; $i_b$ is a phase B current; $K_{d1}$ is a force amplitude of the first harmonic detent torque; $K_{d2}$ is a force amplitude of the second harmonic detent torque; $K_{d4}$ is a force amplitude of the fourth harmonic detent torque; $\phi_1$ is a phase shift of the first harmonic detent torque; $\phi_2$ is a phase shift of the second harmonic detent torque; and $F_s$ is the static friction.

* * * * *